Dec. 1, 1936.  F. W. CORKILL  2,062,505
METHOD OF MAKING BORAX GLASS
Filed Oct. 1, 1934
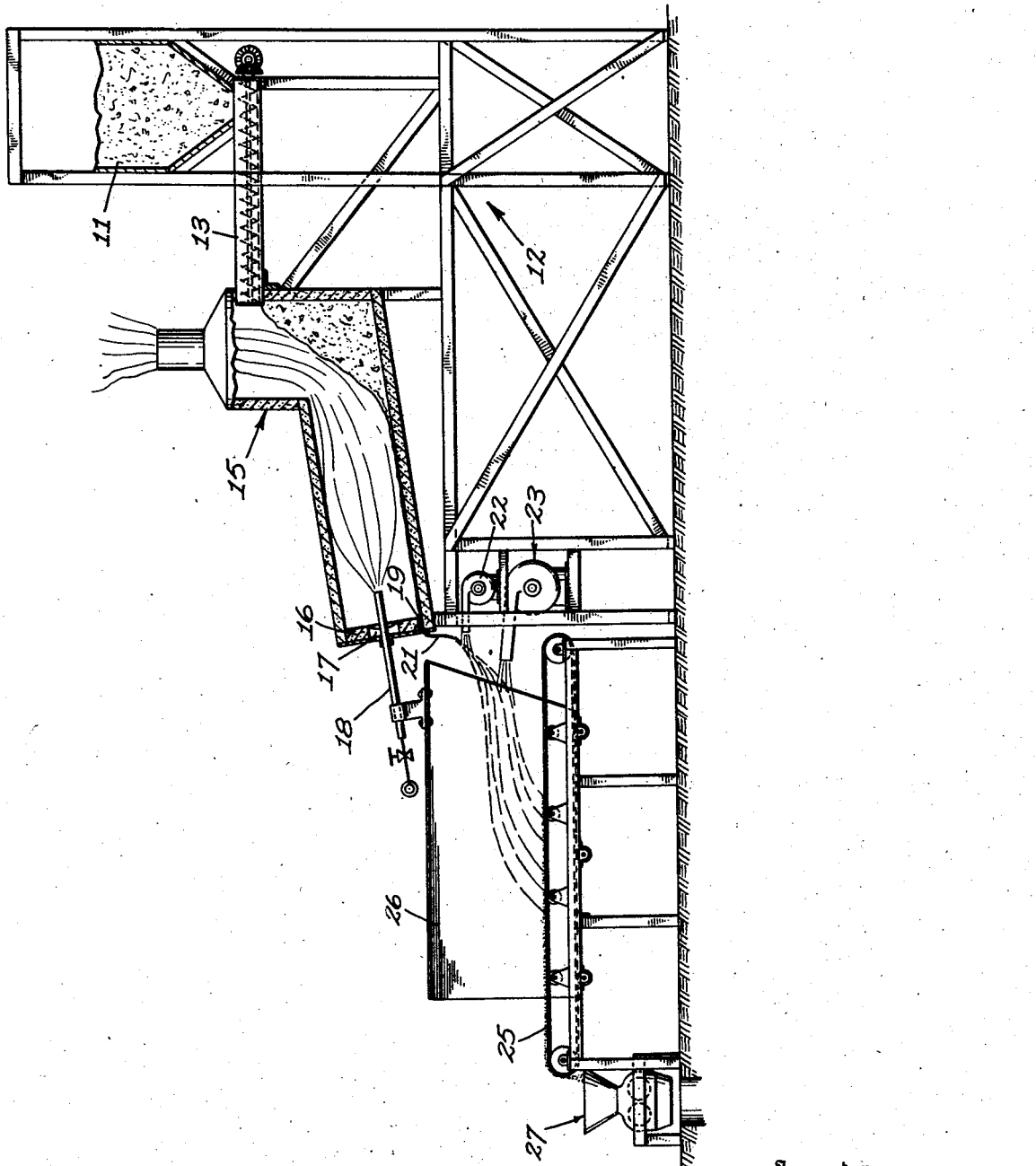
Inventor
Frederick W. Corkill
By
Attorney Patented Dec. 1, 1936

2,062,505

UNITED STATES PATENT OFFICE 2,062,505

METHOD OF MAKING BORAX GLASS

Frederick W. Corkill, Los Angeles, Calif., assignor to Pacific Coast Borax Co., a corporation of Nevada Application October 1, 1934, Serial No. 746,342

5 Claims. (Cl. 83—94)

This invention relates to the manufacture of borax glass and has as its primary object the provision of a method for producing borax glass in a form such that it can be readily ground or pulverized. More specifically, my invention contemplates a method for producing borax glass in a ground or pulverized condition.

As is well known to those familiar with the art, the term "borax glass" applies to the anhydrous vitreous form which sodium tetraborate ($Na_2B_4O_7$) ordinarily assumes when it is cooled from a fused or molten condition. Sodium tetraborate in this form has certain advantages over the more common commercial borax.

($Na_2B_4O_7.10H_2O$)

since the latter material contains substantially 47% of water of crystallization which contributes nothing to the chemical activity of the sodium tetraborate present. The chief advantage of borax glass over commercial borax, therefore, resides in the great saving in shipping costs, since the freight charge on a unit weight of sodium tetraborate in borax glass is substantially half that for a unit weight of sodium tetraborate in crystalline borax due to the freight which must be paid on the water of crystallization in the latter material.

The usual procedure followed in manufacturing borax glass, however, is attended by certain difficulties which have made its introduction to the trade on a commercial scale for all purposes practically impossible in spite of the great saving which could be made in shipping costs if the sodium tetraborate were marketed in the form of glass. In the manufacture of borax glass by the conventional method, a suitable form of sodium tetraborate such as commercial borax, crude borax (tincal), rasorite, and the like, or a calcined or partially calcined hydrate of sodium tetraborate is fused in a suitable furnace until the molten condition is reached. This molten material is then drawn from the furnace into suitable cooling pans where it must remain for at least an hour's time to cool and solidify. The solidified material is then broken up manually with sledge hammers and shoveled from the pans into suitable storage bins or conveyors from which it is delivered to a primary crusher which reduces the material to a size adaptable for pulverization in a pulverizing mill. As is well known to those familiar with the art, borax glass is an extremely hard material and causes excessive wear in the crushing and pulverizing machinery. The upkeep on the crushing and grinding machinery itself is therefore a major factor in the cost of manufacturing marketable borax glass and the contamination of the borax glass, due to the wear in the crushing machinery, renders the same unadaptable to some commercial uses.

It therefore becomes a primary object of this invention to produce a borax glass in a form such that it can be easily and readily pulverized without undue wear in the pulverizing or grinding machinery. It is a further object of this invention to provide a method of the class described which is of continuous operation and in which the time consumed in cooling the molten glass is reduced to a minimum, and the manual operation of breaking up the glass in the cooling pans and the preliminary crushing operation are entirely eliminated. With this in mind my invention contemplates a method in which the molten material is almost instantaneously chilled or cooled in small particles of a size such that they can be delivered directly to a grinding or pulverizing mill, and it is an extremely important feature of this invention that due to the rapid chilling action these small particles are filled with cracks or fractures so that they are of a very frangible nature as compared to the usual type of borax glass and can be pulverized without the excessive wear ordinarily attending the pulverization of this material.

The method contemplated by this invention consists in a general way of, first, fusing or melting sodium tetraborate in any of the various forms in which it occurs in nature or in which it is manufactured from ore or brine. This molten material is then allowed to flow from the furnace in a freely falling stream which is subjected to a blast of air, the air blast being effective to disintegrate or tear up the molten material into small particles, such particles being at the same time quickly chilled and solidified, after which they fall onto a suitable collecting surface such as a conveyor belt from which they can be delivered directly into a pulverizer or grinding mill. In order to obtain the desired product I consider it preferable to employ an air blast of relatively great volume and relatively low velocity to prevent the formation of fine stringers. I have found in actual operation that it is very desirable that the particles be substantially completely solidified before they come in contact with the collecting surface, since there is a tendency, if the particles are in a more or less molten state, for them to spread out on the surface, forming thin flakes of a thickness such that they may pass between the grinder rolls without being broken up. In order to insure the particles being completely chilled to solidification during the air blasting step, I propose to use two blowers or sources of air for effecting this operation. The first air blast through which the stream of material falls is effective to partially disintegrate and chill the material and the second air blast further breaks up the particles which are disintegrated by the first blast and completes the chilling operation so that the individual particles are in the substantially solid state when they reach the collecting surface.

I have found on examination that the small particles of borax glass formed by the process of my invention contain tiny bubbles which apparently result from the material being chilled in the blast of air. These bubbles are further effective to increase the frangible or friable character of the material and the ease with which such material may be ground or pulverized.

The details in the method contemplated by this invention, together with other objects attending its development, will be best understood from the following description of the accompanying drawing, which is chosen for illustrative purposes only, and which shows in sectional elevation one form of apparatus which may be employed in practicing the process.

Referring to the drawing, reference numeral 11 indicates a feed bin which is supported upon a suitable framework or scaffolding generally indicated by reference numeral 12. The feed bin 11 contains sodium tetraborate in any of its various forms such as a hydrate or a calcined hydrate of sodium tetraborate or refined or semi-refined borax or borax ore. Reference numeral 13 indicates a suitable conveyor such as a conventional screw conveyor which is mounted in the bottom of the hopper 11 and is adapted to feed the sodium tetraborate into the top and back of an inclined furnace generally indicated by reference numeral 15.

The furnace 15 may be of any suitable type and is shown as being composed of a refractory material having a closure 16 at its lower end provided with an opening 17 through which a suitable burner 18 extends. The length of the furnace, the rate of feed of the sodium tetraborate and the intensity of the heat are all controlled so that the sodium tetraborate is completely fused and in the molten condition by the time it reaches a port or opening 19 which is shown as being provided in the cover member 16 at the bottom portion of the furnace.

This molten material, as indicated by reference numeral 21, flows downwardly from the opening 19 in a freely falling stream which is subjected to the action of a blast of air coming from any suitable source such as the blower indicated by reference numeral 22.

As has been previously pointed out, I consider it advisable, in order to insure a substantially complete solidification of the particles of borax glass broken up by the blast of air before they reach a collecting surface, to employ, in addition to the blower 22 which I may term a primary blower, a secondary blower generally indicated by reference numeral 23. This secondary blower 23 is preferably situated below the primary blower 22 and I have found that best results are obtained if the secondary blower is of larger capacity than the primary blower.

As has been previously pointed out, the blast of air or the blasts of air coming from these blowers are effective to tear up or disintegrate the stream of molten borax glass into small particles which, under the cooling action of the air, are rapidly chilled and solidified, after which they fall onto a suitable collecting surface such as the upper run of a conveyor belt indicated generally by reference numeral 25. A suitable hood or cover 26 is shown as being positioned over the collecting surface or conveyor belt 25.

As has been previously pointed out, small particles of borax glass formed in this manner are of a size such that they can be delivered directly into a crushing or pulverizing mill such as is generally indicated by reference numeral 27, and their internal structure is such that they can be readily pulverized without undue wear in the grinding surfaces.

Since the process contemplated by this invention may be practiced in connection with crude or partially refined sodium borate ores, such as tincal and rasorite, it is to be understood, as indicated above, that the term "borax glass" as used herein is not limited to a chemically or commercially pure fused sodium tetraborate, as the term is ordinarily used, but includes such products as "rasorite glass" and "tincal glass", such materials being the products of my process when the same is practiced in conjunction with the corresponding sodium borate ores.

It is to be understood that the method contemplated by this invention is not in any way limited to the specific type of apparatus which I have chosen for the purposes of illustrating the same, and that my invention includes within its scope any changes or modifications which fairly come within the spirit of the appended claims.

I claim as my invention:

1. The method of making pulverized borax glass which comprises: fusing sodium tetraborate to produce a molten mass of borax glass; subjecting a freely falling stream of said molten material to the action of an air blast of relatively low velocity and large volume to disintegrate and chill the same without the formation of stringers, thereby causing the molten borax glass to solidify in small particles; collecting the borax glass particles so formed; and grinding the said borax glass particles.

2. The method of making pulverized borax glass which comprises: fusing sodium tetraborate to produce a molten mass of borax glass; subjecting a freely falling stream of said molten material to the action of an air blast of relatively low velocity and large volume to disintegrate and chill the same without the formation of stringers, thereby causing the molten borax glass to solidify in small particles; collecting the borax glass particles so formed; and grinding the said borax glass particles, the magnitude and position of the air blast being controlled so that the borax glass particles are substantially all solidified before they reach the collecting surface.

3. The method of making pulverized borax glass which comprises: fusing sodium tetraborate to produce a molten mass of borax glass; subjecting a freely falling stream of said molten material to a first air blast of relatively low velocity and large volume to partially disintegrate and chill the same without the formation of stringers; then subjecting the falling mass of partially disintegrated material to a second air blast to further disintegrate and chill the material, thereby causing the borax glass to solidify in small particles without the formation of stringers; collecting the borax glass particles so formed; and grinding the collected borax glass particles.

4. In the manufacture of borax glass, the step of subjecting a stream of molten sodium tetraborate to the action of an air blast of relatively low velocity and large volume to disintegrate and rapidly chill the same, whereby the borax glass is solidified in small frangible particles without the formation of stringers.

5. The method of making borax glass which comprises: fusing sodium tetraborate to produce a molten mass; and subjecting a freely falling stream of the molten material to the action of an air blast of relatively low velocity and large volume to disintegrate and rapidly chill the same, whereby the borax glass is solidified in small frangible particles without the formation of stringers.

FREDERICK W. CORKILL.